Aug. 19, 1958 F. A. SCHICK 2,847,871
POSITIVE LOCK AND DETENT MECHANISM FOR SHIFT RODS
Filed Feb. 1, 1957 3 Sheets-Sheet 1

Inventor
Frederick A. Schick
By Charles L. Schwab
Attorney

Aug. 19, 1958 — F. A. SCHICK — 2,847,871
POSITIVE LOCK AND DETENT MECHANISM FOR SHIFT RODS
Filed Feb. 1, 1957 — 3 Sheets-Sheet 2

Inventor
Frederick A. Schick
By Charles E. Schwab
Attorney

Aug. 19, 1958  F. A. SCHICK  2,847,871
POSITIVE LOCK AND DETENT MECHANISM FOR SHIFT RODS
Filed Feb. 1, 1957  3 Sheets-Sheet 3

Inventor
Frederick A. Schick
By Charles L. Schwab
Attorney

United States Patent Office 2,847,871
Patented Aug. 19, 1958

2,847,871

POSITIVE LOCK AND DETENT MECHANISM FOR SHIFT RODS

Frederick A. Schick, Springfield, Ill., assignor to Allis-Chalmers Manufacturing Company, Milwaukee, Wis.

Application February 1, 1957, Serial No. 637,754

9 Claims. (Cl. 74—477)

This invention relates to a change speed transmission and is more particularly concerned with a gear shifting device having an improved detent and positive lock mechanism for shift rods.

Heretofore, in change speed transmissions wherein gears are shiftable by movement of reciprocable shift rods, devices, such as positive locking mechanisms for the shift rods, have been employed in order to prevent accidental shifting when the transmission is in driven engagement with the engine and also detent mechanism to releasably retain the rods in their predetermined gear shifting positions when the transmission shaft is disengaged. In these structures, however, the positive locking mechanism is located and controlled independently from the detent or releasable locking mechanism which requires a multiplicity of parts and therefore is costly to produce. In other conventional mechanisms combining the feature of positively locking the shift rods during engagement of the engine with the transmission and the feature of releasably locking the shift rods during disengagement, a separate detent and locking structure is required for each of the respective shift rods which necessitates a plurality of parts and is therefore costly to produce.

Generally, it is an object of the present invention to provide an improved gear shifting device which automatically prevents shifting of the shift rods during engagement of a clutch means and which releasably retains the shift rods in their respective positions during disengagement of the clutch means.

Another object of the present invention is to provide an improved shift rod control mechanism which performs the dual function of a detent and a positive lock for shift rods which is extremely simple in construction.

Another object of the present invention is to provide an improved detent and locking mechanism, for a plurality of shift rods, which functions to releasably retain the shift rods in their respective neutral or predetermined shifted positions when a clutch means is disengaged uncoupling the transmission shaft from the engine, and to positively lock the shift rods in their respective neutral or predetermined shifted positions when the clutch means is engaged.

More specifically, it is an object of this invention to provide a unitary detent and positive locking mechanism for a plurality of individually shiftable shift rods which performs the dual function of releasably retaining the individual shift rods in their respective neutral or predetermined shifted positions when the clutch means is disengaged and the transmission shaft is uncoupled from the engine, and to positively lock the rods in a neutral or predetermined shifted position when the clutch means is engaged and the transmission shaft is coupled with the engine.

These and other objects and advantages of the invention will be evident from the following description when read in connection with the accompanying drawings in which.

Figure 1:
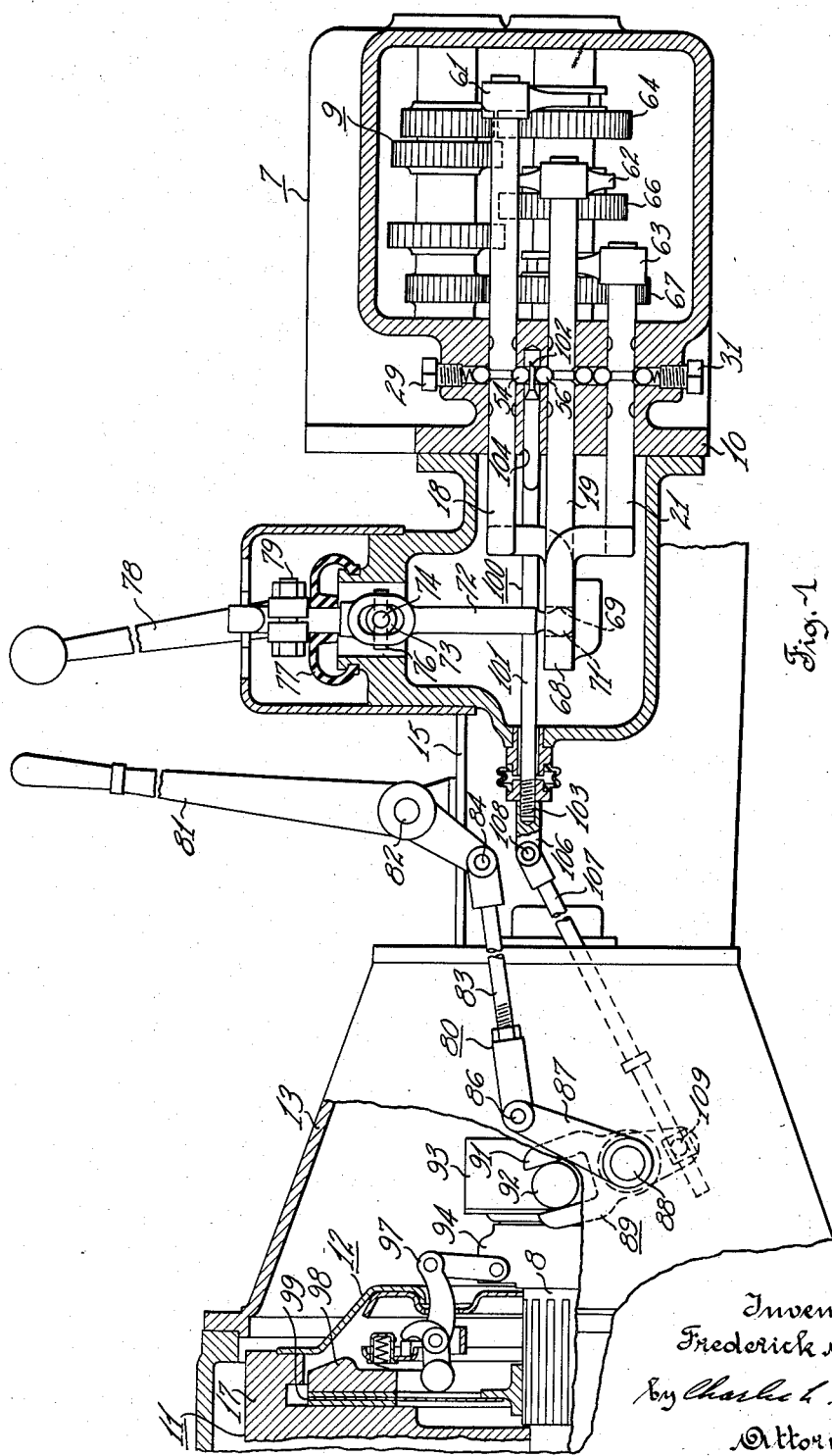
Fig. 1 is a sectional view of a change speed transmission also showing the gear shift mechanism and also the clutch structure which is in the engaged position and the shift rods positively locked in their respective neutral positions.

Referring to Figs. 1, 2, 3, 4, 5 and 6, a change speed transmission assembly 7 of the type having a neutral position and six power transmitting positions includes a support housing 10 in which are rotatably mounted an input shaft 8 and forward and reverse gearing 9. The transmission assembly 7 is associated with a power source such as an internal combustion engine generally indicated by the reference character 11. A clutch assembly 12 is located within a housing 13 for coupling the transmission or input shaft 8, which drives the gearing 9, and the flywheel 17 of engine 11. Both support housing 10 and clutch housing 13 are fixedly secured to a main frame 15.

In a positive lock and detent mechanism 16 a first shift rod 18, a second shift rod 19 and a third shift rod 21 are reciprocably mounted respectively in longitudinal bores 22, 23 and 24 which are provided in the support housing 10. The rods 18, 19 and 21 are coplanar and in spaced parallel relation from each other and individually shiftable longitudinally in opposite directions from a neutral position into predetermined shifted or gear engaging positions. Shift rod 18 is provided with three pairs of oppositely spaced recess portions, a first pair 32 and 33 coinciding with a neutral position, a second pair 34 and 36 coinciding with a predetermined shifted position being spaced longitudinally in one direction from the first pair, and a third pair 37 and 38 coinciding with another predetermined shifted position being spaced longitudinally from the first pair, in the opposite direction from the second pair. Rod 19 is provided with a first pair of oppositely spaced recess portions 39 and 41 coinciding with a neutral position and second and third recess portions 42 and 43 are spaced longitudinally on opposite sides of recess 39 and coincide with the predetermined shifted positions, respectively. Rod 21 is provided with three pairs of oppositely spaced recess portions, a second pair 46, 47 and a third pair 48, 49 coinciding, respectively, with predetermined shifted positions of rod 21, being spaced longitudinally on opposite sides, respectively, of a first pair of recesses 51 and 52, which coincide with the neutral position of rod 21. A transverse bore 26 having an axis coplanar with and perpendicular to the rods 18, 19 and 21 is provided in the support housing 10 intermediate the ends of and in communication with bores 22, 23 and 24. An upper portion 27 and a lower portion 28 of bore 26 are threaded to receive threaded plugs 29 and 31, respectively. Retaining elements 53, 54, 56, 57, 58 and 59 are spherically shaped balls which are reciprocably mounted in bore 26 in aligned relationship on the axis of bore 26. The first pair of elements 53 and 54 are located, respectively, on opposite sides of and adjacent to shift rod 18, and are selectively registerable, respectively, with pairs of recess portions 32 and 33, 34 and 36, and 37 and 38. The second pair of elements 56 and 57 are located, respectively, on opposite sides of and adjacent to shift rod 19, element 56 being registerable with recesses 39, 42 and 43, respectively, and element 57 being registerable with recess 41. The third pair of elements 58 and 59 are located, respectively, on opposite sides of and adjacent to rod 21, being registerable, respectively, with recess portions 46 and 47, 51 and 52, and 48 and 49. Plug 29 holds an axially compressed helical spring 44 in contact with element 53 and plug 31 holds an axially compressed spring 45 in contact with element 59. Springs 44 and 45 provide a resilient means which react between the support 10 and the corresponding elements 53 and 59, respectively, to transmit thrust along the axis of bore 26. A transverse bore 112 is provided in the recess portions 32 and 33 of the first rod 18, in which is reciprocably mounted a thrust transmitting means or slide pin 113 operable to transmit thrust from element 53 to element 54 when rod 18 is in the neutral position. In recess 39 and 41 of rod 19, a transverse bore 114 is provided in which is reciprocably mounted a thrust transmitting means or slide pin 116 which transmits thrust from element 56 to element 57 when rod 19 is in neutral, and in the recess portions 51 and 52 of rod 21 a transverse bore 117 is provided in which is reciprocably mounted a thrust transmitting means or slide pin 118 which transmits thrust between elements 58 and 59 when rod 21 is in neutral.

Referring to Fig. 1, shift arms 61, 62 and 63 are attached, respectively, to the shift rods 18, 19 and 21 in order to transmit longitudinal shifting movement to slidably mounted gears 64, 66 and 67 of the change speed transmission 7 in the conventional manner. Shift heads 68, being formed at the ends of shift rods 18, 19, 21, respectively, are of conventional construction. Seats 69 are provided in the shift heads 68 for selective engagement by ball head 71 of the gear shift lever 72. The gear shift lever 72 is universally mounted on the housing 10 in a conventional manner, being pivotally mounted on a sleeve 73 by a pin 76 with the sleeve 73 in turn being pivotally mounted in the housing 10 by pin 74. A flexible boot 77 is provided to prevent foreign matter from entering the interior of the support housing. A selector or hand lever 78 is attached to lever 72 by nut and bolt 79.

A clutch means is comprised of the conventional type friction plate clutch assembly 12 and a clutch actuating assembly 80. The assembly 80 includes the following structure: hand lever 81 is pivotally mounted adjacent one end on the main frame 15 by a pin 82; adjustable linkage 83 is pivotally attached at one end by pin 84 to lever 81 and pivotally attached at the other end by pin 86 to an arm 87; arm 87 is keyed to a shaft 88 which in turn is pivotally mounted on the clutch housing 13; a shifting yoke 89 is also keyed, intermediate its opposite ends, on shaft 88 for rotatable movement therewith; slidably received in the bifurcated end 91 of the yoke 89 is a stud 92 which is rigidly mounted on a bearing carrier 93 which in turn is rotatably mounted on a sleeve assembly 94 which in turn is longitudinally slidable on the input or transmission shaft 8. A linkage 97 connects the sleeve assembly 94 and the pressure plate 98. The clutch assembly 12 includes pressure plate 98 which holds clutch plate 99 in frictional contact with flywheel 17 when actuated by linkage 97. The precise structure of clutch assembly 12 is of no consequence as the structure and functioning of a conventional type plate friction clutch is well understood. The structure and function of the clutch means which is of significance to the invention is that lever 81 is rotated in one direction to engage the clutch means and thereby couple the power source or engine 11 with the input shaft 8 and that lever 81 is rotated in the opposite direction whereby the clutch means are disengaged and the engine 11 is uncoupled from the input shaft 8.

A locking means 100 (a portion of which is also shown in Figs. 2, 3, 4, 5 and 6), comprising a rod or plunger 101 and having a finger 102 rigidly attached at one end and a threaded portion 103 at the opposite end thereof, is slidably mounted in a bore 104 which is provided in the support housing 10 and is coplanar with and parallel to bores 22, 23 and 24. The threaded portion 103 is received into a threaded bore of the link member 106. The locking means 100 is associated with the clutch means in the following way. A linking rod 107 is pivotally connected at one end by pin 108 to link member 106 and the other end pivotally connected by pin 109 to the lower end of yoke 89, thus providing a linkage which is responsive to the movement of the hand lever 81. When lever 81 is shifted to the right to engage the clutch means (as shown in Fig. 1), link 83 is moved to the left thereby rotating arm 87, shaft 88 and yoke 89 in a counterclockwise direction simultaneously moving rod 107, link 106 and locking means 100 to the right and wedging finger 102 in between a pair of adjacent elements 54 and 56 which are interposed between rods 18 and 19. When clutch lever 81 is shifted to the left to disengage the clutch means, link 83 is moved to the right, thereby rotating arm 87, shaft 88 and yoke 89 in a clockwise direction simultaneously moving rod 107, link 106 and locking means 100 to the left, whereby finger 102 is withdrawn from between elements 54 and 56.

Figures 2, 3:
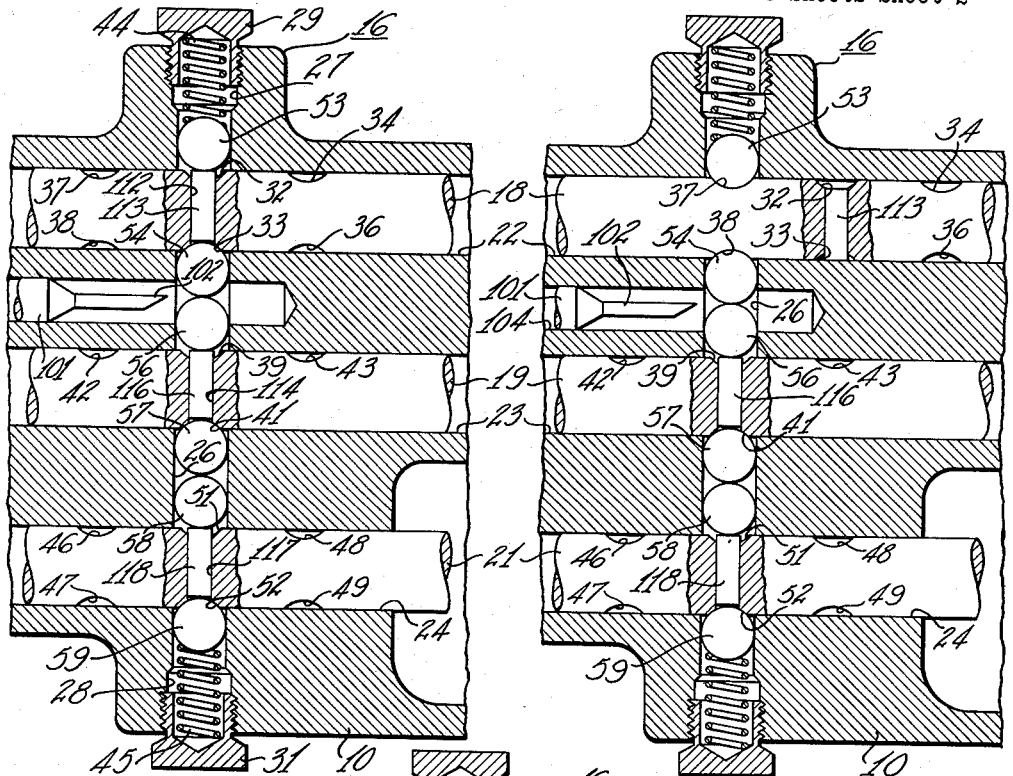
Fig. 2 is a section showing an enlarged view of the combined positive lock and detent mechanism showing the three shift rods releasably retained in their respective neutral positions.
Fig. 3 is a sectional view similar to Fig. 2, but shows the upper or first shift rod shifted into a predetermined drive establishing position.

Referring to Fig. 2, showing positive lock and detent mechanism 16, rods 18, 19 and 21 are in their respective neutral positions, the clutch means are disengaged and the locking means 100 withdrawn from between elements 54 and 56. Since spring 45 overrules spring 44 thrust is being transmitted from spring 45 to element 59 thence to element 57 through pin 118 and element 58, and thence to element 54 through pin 116 and element 56. Pin 113 is operative to transmit thrust from element 54 to element 53 and thence to spring 44 which yields, having been overcome by spring 45. A detent means including spring 45, elements 54, 56, 57, 58, 59 and slide pins 116, 118 which coact with each other and with recesses 33, 39 and 51 in the following manner. Element 59 is biased into registration with recess 52 by spring 45, element 57 is biased into registration with recess 41 by spring 45 acting through element 59, pin 118 and element 58, and element 54 is biased into registration with recess 33 by spring 45 acting through element 59, pin 118, elements 57 and 58, pin 116 and element 56. Elements 59, 57 and 54 cooperate respectively with recesses 52, 41 and 33 and with support 10 at the walls of bore 26, thereby releasably retaining the shift rods 18, 19 and 21, respectively, in the neutral position so as to prevent accidental shifting of the rods whenever the clutch means are disengaged. When lever 81 is moved to the right engaging the clutch means (as best shown in Fig. 1), locking means 100 is moved between elements 54 and 56 with finger 102 displacing element 56 downward a distance equal to the width of finger 102 which is equal to the depth of one of the recesses. Upon being wedged between elements 54 and 56 locking means 100 is operative to actuate the locking elements that include elements 54, 56, 57, 58 and slide pins 116, 118 which coact with each other in the following manner. Element 54 is maintained by finger 102 in recess 33; element 56 is displaced into recess 39 and maintained therein by finger 102; and element 58, is displaced downward into recess 51 and maintained therein by finger 102 acting through pin 116 which is displaced downward by element 56, and element 57 is displaced downward by pin 116. The locking elements cooperate respectively with recesses 33, 39 and 51 and with the walls of bore 26 in support housing 10 to positively lock rods 18, 19 and 21 in their respective neutral positions thereby preventing longitudinal shifting.

Referring to Fig. 3 showing mechanism 16, the clutch means are disengaged, locking means 100 has been withdrawn from between elements 54 and 56, and rod 18 has been shifted to the right into one of the predetermined shifted positions while rods 19 and 21 remain in their respective neutral positions. The detent means releasably retain rods 19 and 21, respectively, in a neutral position in the same manner as described herein for the position shown in Fig. 2. The detent means for rod 18, however, includes, in addition to the structure described in connection with Fig. 2, element 53 which is biased by spring 44 into recess 37 to also releasably retain rod 18 in a predetermined shifted position. Should rod 18 be shifted to the left of neutral into the other predetermined shifted position, the detent means would function to releasably retain rods 19 and 21, respectively, in their neutral position and rod 18 in a shifted position in the same manner as described for Fig. 2 except that element 53 would be biased into recess 34 and element 54 into recess 36.

Figure 4:
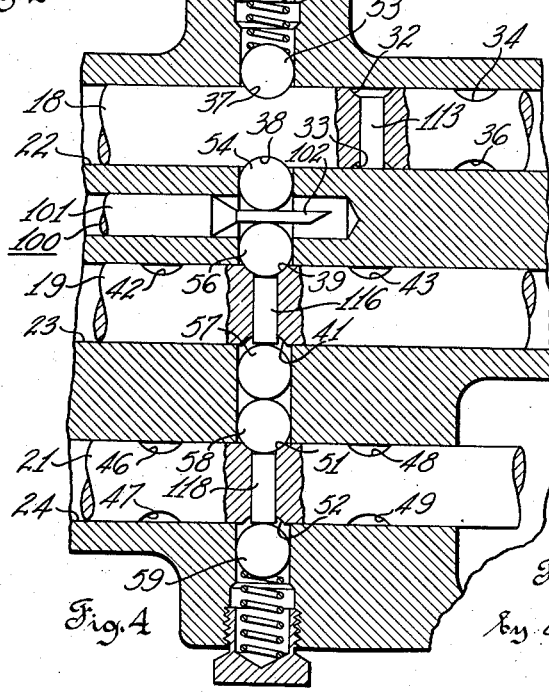
Fig. 4 is similar to Fig. 3, but shows the locking member positively locking the shift rods when the clutch means have been engaged and the transmission is coupled with the engine.

Referring to Fig. 4, showing mechanism 16 with rod 18, as in Fig. 3, in the shifted position, the clutch means have been engaged moving locking means 100 between elements 54 and 56 to actuate the locking elements. The locking elements for shift rods 18, 19 and 21, respectively, function the same as hereinbefore described for the positions shown in Fig. 1, except that element 54 is retained by finger 102 in recess 38 to positively lock rod 18 in a predetermined shifted position. Should rod 18 be shifted to the right of neutral into the other predetermined shifted position and the transmission engaged, the locking elements will function the same as hereinbefore described for the position shown in Fig. 3 except that element 54 would be retained by finger 102 in recess 36.

Figure 5:
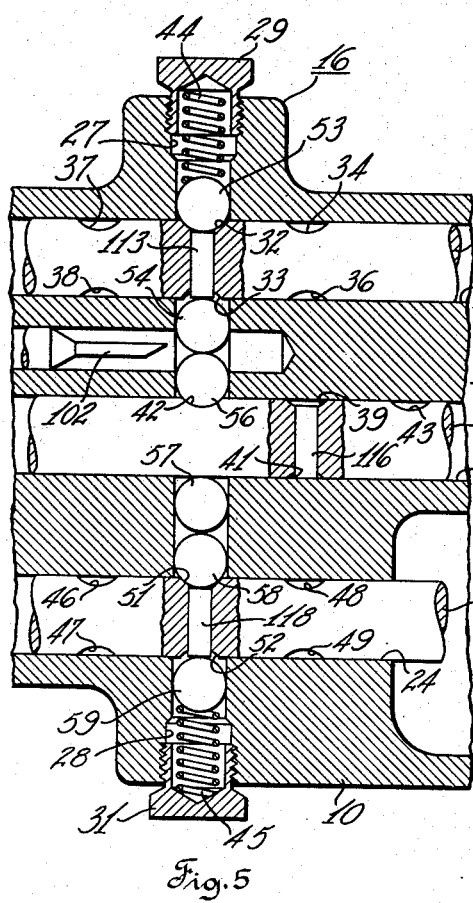
Fig. 5 is a sectional view similar to Fig. 2, but showing the center or second shift rod shifted into a predetermined drive establishing position.

Referring to Fig. 5 showing mechanism 16 with rods 18 and 21 in their respective neutral positions and rod 19 shifted to the right into a predetermined shifted position, when rod 19 is shifted to either the right or left of neutral into a predetermined shifted position, the second locking elements are operative to positively lock rod 21 in a neutral position regardless of whether or not the clutch means are engaged. The second locking elements include elements 57 and 58, which cooperate with recess 51 and support 10 in the following manner. Rod 19 is spaced a predetermined distance from rod 21 which distance is less than the sum of the diameters of elements 57 and 58 by an amount equal to the depth of one of the recesses. Therefore, when rod 19 is shifted either to the left or right of neutral into a predetermined shifted position, element 57 is urged out of recess 41 and displaced downward urging element 58 into recess 51. When rod 19 is in a predetermined shifted position there is no recess portion registerable with element 57, and element 58 is maintained in registration with recess 51 by rod 19. Element 58 cooperates with recess 51 and the support 10 at the walls of bore 26 so as to positively lock rod 21 in the neutral position until such time as rod 19 is returned to neutral position.

The detent means including spring 44, pin 113 and elements 53, 54 and 56, cooperates with recesses 32 and 39 and support 10 in the following manner. Spring 44 is in contact with element 53 biasing it into registration with recess 32. Spring 44 acts through element 53, slide pin 113 and element 54 to bias element 56 into recess 39. Elements 53 and 56 cooperate respectively with recesses 32 and 39 and the walls of bore 26 of support 10 to releasably maintain rod 18 in neutral position and rod 19 in a predetermined shifted position.

Upon engagement of the clutch means, locking means 100 is wedged between the pair of adjacent elements 54 and 56 to actuate the locking elements for rods 18 and 19, respectively, in the following manner. Finger 102 maintains element 56 in registration with recess 39 and element 54 is displaced upward into recess 33 and maintained therein by finger 102. The locking elements including elements 54 and 56 cooperate respectively with recesses 33 and 39 and the walls of bore 26 of support 10 to positively lock rod 18 in neutral and rod 19 in a predetermined shifted position.

Figure 6:
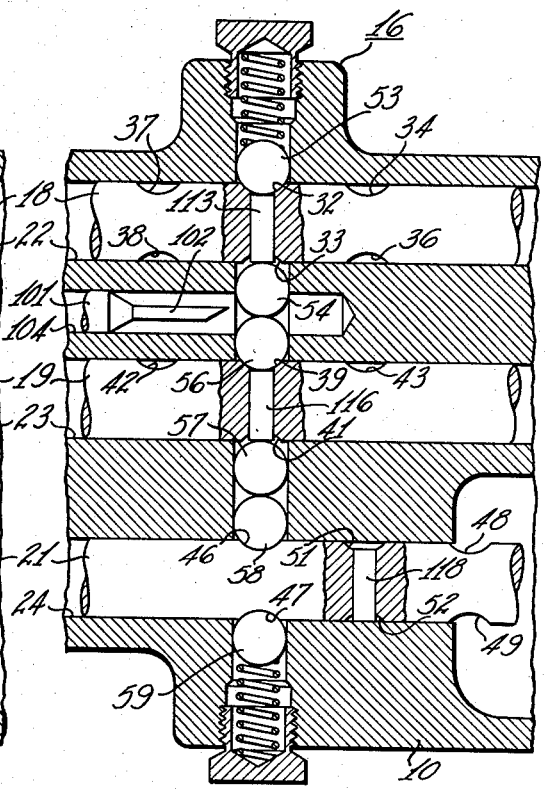
Fig. 6 is a sectional view similar to Fig. 2, but showing the lower or third shift rod shifted into a predetermined drive establishing position.

Referring to Fig. 6, showing mechanism 16, rods 18 and 19 are in their respective neutral positions and rod 21 is shifted to the right into a predetermined shifted position during disengagement of the clutch means and withdrawal of locking means 100 from between elements 54 and 56. The detent means for releasably retaining rods 18 and 19, respectively, function the same as hereinbefore described for the positions of rods 18 and 19 shown in Fig. 5, except that element 56 is biased into recess 39 of rod 19. The detent means releasably retaining rod 21 in a shifted position includes spring 44 acting through element 53, pin 113, elements 54 and 56, pin 116 and element 57, in that order, to bias element 58 into recess 46. An additional detent means for releasably retaining rod 21 in the shifted position includes spring 45 biasing element 59 into recess 47.

Upon engagement of the clutch means, locking means 100 is moved in between elements 54 and 56, thereby actuating the locking elements for rods 18, 19 and 21, respectively, which include elements 54, 56, 57 and 58, and pin 116, which coact with each other and cooperate with recesses 32, 39 and 46, and support 10 in the following manner. Upon movement of the locking means 100 between elements 54 and 56, element 54 is displaced upward into recess 32 and maintained therein by finger 102. Element 56 is maintained by finger 102 in recess 39. Element 58 is also maintained in recess 46 by finger 102 acting through pin 116 and element 57 which are effectively interposed between element 58 and finger 102. Rods 18 and 19 are thereby positively locked in their respective neutral positions while rod 21 is positively locked in a shifted position. Should rod 21 be shifted to the left of neutral into the other predetermined shifted position, the detent means and locking means would function as described herein, except that element 58 would be biased into recess 48 during disengagement, and positively maintained in recess 48 during engagement of the clutch means.

It will be apparent from the drawings and the foregoing detailed description that a novel design and construction for a gear shifting mechanism has been illustrated wherein various combinations of a single group of coacting parts, namely, elements 53, 54, 56, 57, 58 and 59, springs 44 and 45 and slide pins 113, 116 and 118, are utilized both as a detent means and positive locking elements to releasably retain shift rods 18, 19 and 21 in their respective neutral and shifted positions when a clutch means is disengaged and to automatically prevent shifting of the rods altogether during engagement of the clutch means. The construction of this mechanism is extremely simple and compact and is completely reliable, requiring very little maintenance, although when servicing is necessary the maximum of accessibility is provided.

It should be understood that although only one embodiment of the invention has been described in detail, it is not intended to limit the invention to the particular form herein, otherwise than is necessitated by the scope of the appended claims.

What is claimed is:

1. A positive lock and detent mechanism comprising: a support housing; first and second coplanar shift rods reciprocably mounted on said support in spaced parallel relation to each other, said rods being individually shiftable from a neutral position into predetermined shifted positions; recess portions provided in said rods coinciding respectively with said neutral and shifted positions; a pair of adjacent retaining elements reciprocably mounted on said support being interposed between said shift rods, said retaining elements being aligned on an axis coplanar with and perpendicular to said rods and registerable respectively with said recess portions; thrust transmitting means reciprocably mounted in said rods, respectively, being operatively engageable with said retaining elements; resilient means anchored on said support for imparting thrust to said retaining elements and said thrust transmitting means whereby one of said retaining elements is biased into registration with one of said recess portions in each of said shifting rods to releasably retain the latter respectively in said neutral and shifted positions; locking means mounted on said support for maintaining one of said retaining elements in registration with one of said recess portions in each of said rods thereby positively locking the latter respectively in said neutral and shifted positions.

2. A positive lock and detent mechanism comprising: a support housing; first and second coplanar shift rods reciprocably mounted on said support in spaced parallel relation to each other, said rods being individually shiftable from a neutral position into predetermined shifted positions; recess portions provided in said rods coinciding respectively with said neutral and shifted positions; a pair of adjacent retaining elements reciprocably mounted on said support being interposed between said shift rods, said retaining elements being aligned on an axis coplanar with and perpendicular to said rods and registerable respectively with said recess portions; thrust transmitting means reciprocably mounted in said rods, respectively, and being operatively engageable with said retaining elements in one of said positions; resilient means anchored on said support for imparting thrust to said retaining elements and said thrust transmitting means whereby one of said retaining elements is biased into registration with one of said recess portions in each of said shifting rods to releasably retaining the latter respectively in said neutral and shifted positions; and a locking means reciprocably mounted on said support and insertable between said pair of retaining elements whereby each of said pair is maintained in registration with one of said recess portions of said shift rods thereby positively locking the latter respectively in said neutral and shifted positions.

3. A positive lock and detent mechanism comprising: a support housing; a first and a third shift rod coplanar with and at opposite sides respectively of a second shift rod, said rods being reciprocably mounted on said support in spaced parallel relation to each other, and individually shiftable from a neutral position into predetermined shifted positions; recess portions provided in said rods coinciding respectively with said neutral and shifted positions; a pair of adjacent retaining elements being interposed respectively between said first and second and said second and third shift rods, said retaining elements being reciprocably mounted on said support, aligned on an axis coplanar with and perpendicular to said rods and registerable respectively with said recess portions; thrust transmitting means reciprocably mounted in said rods, respectively, and being operatively engageable with said retaining elements in said neutral position; resilient means anchored on said support for imparting thrust to said retaining elements and said thrust transmitting means whereby one of said retaining elements is biased into registration with one of said recess portions in each of said shifting rods to releasably retaining the latter respectively in said neutral and shifted positions; locking means coacting with said retaining elements and thrust transmitting means whereby one of said retaining elements is maintained in registration with one of said recess portions in each of said shift rods to positively lock said the latter respectively in said neutral and shifted positions when said second rod is in said neutral position.

4. A positive lock and detent mechanism comprising: a support housing; a first and a third shift rod mounted coplanar with and at opposite sides respectively of a second shift rod, said rods being reciprocably mounted on said support in spaced parallel relation to each other, and individually shiftable from a neutral position into predetermined shifted positions; recess portions provided in said rods coinciding respectively with said neutral and shifted positions; a pair of retaining elements located respectively on opposite sides of and adjacent to each of said shift rods respectively, said retaining elements being reciprocably mouned on said support in aligned relation on an axis coplanar with and perpendicular to said rods and registerable respectively with said recess portions; a slide pin reciprocably mounted in one of said recess portions in each of said rods and being operatively engageable with said pair of retaining elements when in said neutral position; resilient means anchored on said support for imparting thrust to said retaining elements and thrust transmitting means whereby one of said retaining elements is biased into registration with one of and said recess portion in each of said shifting rods to releasably retaining the latter respectively in said neutral and shifted positions; locking means coacting with said retaining elements and said slide pins whereby one of said retaining elements is maintained in registration with one of said recess portions in each of said rods thereby to positively locking the latter respectively in said neutral and shifted positions when said second rod remains in said neutral position; and a linkage means mounted on said support for actuating said locking means by moving the latter in between one of said retaining elements adjacent said second rod and one of said retaining elements adjacent one of the other of said rods and operatively displacing one of said retaining elements.

5. In a transmission assembly of the type including a support housing, an input shaft, reverse and change speed gearing, first and second coplanar shift rods in spaced parallel relation from each other and individually movable from a neutral into predetermined shifted positions, and clutch means operable when engaged to couple and when disengaged to uncouple a power source and said input shaft; a combined positive lock and detent mechanism for said shift rods, said mechanism comprising: recess portions provided in each of said shift rods coinciding respectively with said neutral and shifted positions; a pair of adjacent retaining elements interposed between said shift rods, said retaining elements reciprocably mounted on said support in aligned relation along an axis coplanar with and perpendicular to said shift rods and registerable with said recess portions; a thrust transmitting means carried by each of said rods being operatively engaged with said pair of retaining elements in one of said positions; resilient means anchored on said support for imparting thrust to said retaining elements and said thrust transmitting means whereby one of said retaining elements is biased into registration with one of said recessed portions in each of said shifting rods to releasably retain the latter respectively in said neutral and shifted positions; locking means reciprocably mounted on said support for maintaining one of said retaining elements in registration with one of said recess portions in each of said rods to positively lock the latter respectively in said neutral and shifted positions; and linkage means interconnecting said clutch means and said locking means for actuating the latter as said clutch means are engaged.

6. In a transmission assembly of the type including a support housing, input shaft, reverse and change speed gearing, first and second coplanar shift rods in spaced parallel relation to each other and individually movable from a neutral into predetermined shifted positions, and clutch means operable when engaged to couple and when disengaged to uncouple a power source with said input shaft; a combined positive lock and detent mechanism for said shift rods, said mechanism comprising: recess portions provided in each of said shift rods corresponding respectively to said neutral and shifted positions; a pair of adjacent retaining elements interposed between said shift rods, said retaining elements being reciprocably mounted on said support in aligned relation along an axis coplanar with and perpendicular to said shift rods and registerable with said recess portions; thrust transmitting means carried by each of said rods, being operatively engaged with said pair of retaining elements in said neutral position; resilient means anchored on said support for imparting thrust to said retaining elements and thrust transmitting means whereby one of said retaining elements is biased into registration with one of recess portions in each of said shift rods thereby releasably retaining the latter respectively in said neutral and shifted positions; a locking means reciprocably mounted on said support; and a linkage means interconnecting said clutch means and said locking means, the latter being movable in between said pair of retaining elements as said clutch means are engaged, to operatively retain one of said elements respectively in registration with one of said recess portions in each of said shift rods thereby, positively locking the latter respectively in said neutral and shifted positions.

7. In a transmission assembly of the type including a support housing, input shaft, reverse and change speed gearing, first and third shift rods mounted coplanar with and at opposite sides respectively of a second shift rod in spaced parallel relation to each other and individually movable from a neutral into predetermined shifted positions, and clutch means operable when engaged to couple and when disengaged to uncouple a power source with said input shaft; a combined positive lock and detent mechanism for said shift rods, said mechanism comprising: recess portions provided in each of said shift rods corresponding respectively to said neutral and shifted positions; a pair of retaining elements located respectively on opposite sides of and adjacent to said shift rods respectively, said retaining elements being reciprocably mounted on said support in aligned relation on an axis coplanar with and perpendicular to said shift rods and registerable with said recess portions; a slide pin reciprocably mounted in one of said recess portions in each of said rods, said slide pin being operatively engaged respectively with said pair of retaining elements in said neutral position; resilient means anchored on said support for imparting thrust to said slide pins, and retaining elements, whereby one of said retaining elements is biased into registration with one of said recess portions in each of said shift rods thereby releasably retaining said the latter respectively in said neutral and shifted positions; locking means coacting with said retaining elements, and said slide pins for maintaining one of said retaining elements in registration with one of said recess portions in each of said shift rods to positively lock the latter respectively in said neutral and shifted positions when said second rod remains in said neutral position; a locking means reciprocably mounted on said support; and a linkage means interconnecting said clutch means and said locking means, the latter being responsive as said clutch means are engaged, to automatically lock said shift rods.

8. In a transmission assembly of the type including a support housing, input shaft, reverse and change speed gearing, first and third shift rods mounted coplanar with and at opposite sides respectively of a second shift rod being in spaced parallel relation to each other and individually movable from a neutral into predetermined shifted positions, and clutch means operable when engaged to couple and when disengaged to uncouple a power source with said input shaft; a combined positive lock and detent mechanism for said shift rods, said mechanism comprising: recess portions provided in each of said shift rods corresponding respectively to said neutral and shifted positions; a pair of retaining elements located respectively on opposite sides of and adjacent to said shift rods respectively, said retaining elements being reciprocably mounted on said support in aligned relation along an axis coplanar with and perpendicular to said shift rods and registerable with said recess portions; a slide pin reciprocably mounted in one of the said recess portions in each of said rods, said slide pin being operatively interposed respectively between said pair of retaining elements in said neutral position; resilient means anchored on said support for imparting thrust to said slide pins and said retaining elements whereby one of said retaining elements is biased into registration with one of said recess portions in each of said shift rods to releasably retain the latter respectively in said neutral and shifted positions when said clutch means are disengaged; a locking means reciprocably mounted on said support; a linkage means interconnecting said clutch means and said locking means, the latter being wedged in between one pair of said retaining elements as said clutch means are engaged whereby each of said retaining elements of said one pair are maintained in registration respectively with one of said recess portions in each of said shift rods thereby positively locking the latter to prevent shifting during engagement of said clutch means.

9. In a transmission assembly of the type including a support housing, input shaft, reverse and change speed gearing, a first and third shift rod mounted coplanar with and at opposite sides respectively of a second shift rod being in spaced parallel relation to each other and individually movable from a neutral into predetermined shifted positions, and clutch means operable when engaged to couple and when disengaged to uncouple a power source with said input shaft; a combined positive lock and detent mechanism for said shift rods, said mechanism comprising: recess portions provided in each of said shift rods corresponding respectively to said neutral and shifted positions; a pair of retaining elements located respectively on opposite sides of and adjacent to said shift rods respectively, said pair of retaining elements adjacent said second shift rod being in thrust transmitting contact respectively with one of said retaining elements adjacent said first and third shift rods respectively, all said retaining elements being reciprocably mounted on said support in aligned relation along an axis coplanar with and perpendicular to said shift rods and registerable with said recess portions; a slide pin reciprocably mounted respectively in said recess portions coinciding with the neutral position of each of said rods, said slide pins being interposed in thrust transmitting relation between said pairs of retaining elements respectively in said neutral position; resilient means anchored on said support for imparting thrust to said slide pins, and said retaining elements whereby one of said retaining elements is biased into registration with one of said recess portions in each of said shift rods thereby releasably retaining the latter respectively in said neutral and shifted positions when said clutch means are disengaged; a locking means reciprocably mounted on said support; a linkage means interconnecting said clutch means and said locking means for wedging the latter in between one of said retaining elements adjacent said second shaft and one of said retaining elements adjacent said first shaft separating them and operatively retaining one of each said pair of retaining elements respectively in registration with one of said recess portions in each of said rods upon engagement of said clutch means thereby positively locking said rods respectively in said neutral and shifted positions when said second rod remains in said neutral position, one of said retaining elements adjacent said third shift rod being maintained in registration with one of said recess portions in said third rod to positively lock the latter upon movement of said second shift rod out of said neutral position.

No references cited.